United States Patent
Shylanski et al.

(10) Patent No.: US 7,583,372 B2
(45) Date of Patent: Sep. 1, 2009

(54) MACHINE VISION VEHICLE WHEEL ALIGNMENT IMAGE PROCESSING METHODS

(75) Inventors: Mark S. Shylanski, University City, MO (US); Daniel R. Dorrance, Ballwin, MO (US); Thomas J. Golab, St. Peters, MO (US); Leigh R. Burns, Jr., Troy, IL (US)

(73) Assignee: Hunter Engineering Company, Bridgeton, MO (US)

( * ) Notice: Subject to any disclaimer, the term of this patent is extended or adjusted under 35 U.S.C. 154(b) by 89 days.

(21) Appl. No.: 11/421,181

(22) Filed: May 31, 2006

(65) Prior Publication Data

US 2006/0274302 A1    Dec. 7, 2006

Related U.S. Application Data

(60) Provisional application No. 60/686,248, filed on Jun. 1, 2005.

(51) Int. Cl.
*G01B 11/26* (2006.01)
(52) U.S. Cl. .................................. 356/139.09
(58) Field of Classification Search ............ 356/139.09, 356/3.01–3.15, 4.01–4.1, 5.01–5.15, 6–22, 356/128, 128.5, 139.1
See application file for complete search history.

(56) References Cited

U.S. PATENT DOCUMENTS

| | | | |
|---|---|---|---|
| 6,064,750 A | 5/2000 | January et al. | |
| 6,341,013 B1 | 1/2002 | Battiti et al. | |
| 6,690,456 B2 | 2/2004 | Bux et al. | |
| 6,691,062 B1 | 2/2004 | Nobis | |
| 6,710,866 B1 | 3/2004 | Adolph | |
| 6,894,771 B1 | 5/2005 | Dorrance et al. | |
| 6,915,228 B2 | 7/2005 | Uffenkamp et al. | |
| 7,177,740 B1 * | 2/2007 | Guangjun et al. | 701/34 |
| 2005/0030525 A1 | 2/2005 | Forster et al. | |
| 2005/0068522 A1 * | 3/2005 | Dorrance et al. | 356/139.09 |
| 2006/0274302 A1 * | 12/2006 | Shylanski et al. | 356/139.09 |

OTHER PUBLICATIONS

Issac Cohen, A Hyperquadric Modle for 2-D and 3-D Data Fitting, 1994, B.P. 105, 78153 Le Chesnay Cedex France.*

* cited by examiner

*Primary Examiner*—Thomas H Tarcza
*Assistant Examiner*—Luke D Ratcliffe
(74) *Attorney, Agent, or Firm*—Polster, Lieder, Woodruff & Lucchesi, L.C.

(57) ABSTRACT

A method of the present invention provides methods for processing images of vehicle wheel assemblies acquired during vehicle service procedures to determine vehicle wheel assembly pose components, from which vehicle wheel alignment angles may be calculated.

17 Claims, 8 Drawing Sheets

Axis Of Rotation
Rough Estimation**

Axis Of Rotation
Accurate Estimation**

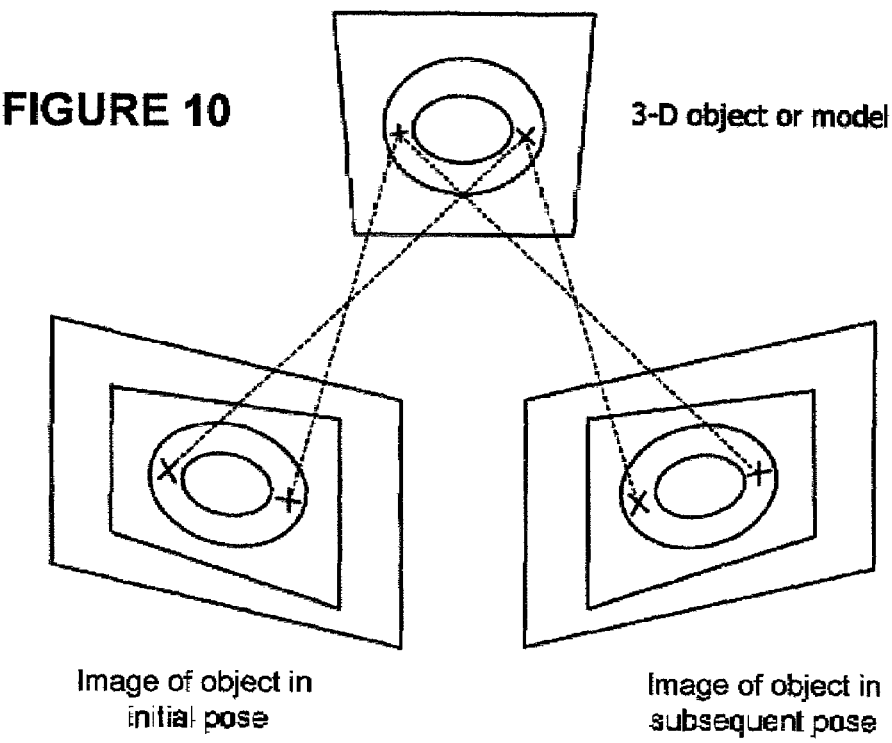
FIGURE 10
Image of object in initial pose
Image of object in subsequent pose
3-D object or model
F: feature point
$P_L$: left camera pinhole
$P_R$: right camera pinhole
N: normal point
b: stereo baseline
S: lateral displacement
R: range
$\theta_L$: left camera feature angle
$\theta_R$: right camera feature angle
FIGURE 12
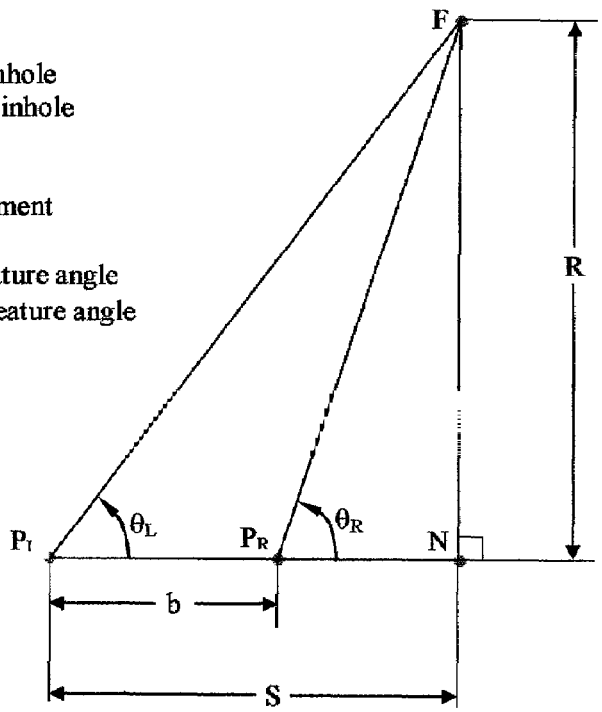
Locating a 3-D feature by stereoscopic triangulation

MACHINE VISION VEHICLE WHEEL ALIGNMENT IMAGE PROCESSING METHODS

CROSS-REFERENCE TO RELATED APPLICATIONS

The present application is related to, and claims priority from, U.S. Provisional Patent Application No. 60/686,248 filed on Jun. 1, 2005, herein incorporated by reference.

STATEMENT REGARDING FEDERALLY SPONSORED RESEARCH

Not Applicable.

BACKGROUND OF THE INVENTION

The present invention relates generally to machine vision vehicle wheel alignment systems configured to measure the locations and orientation of the wheels of a vehicle in a three dimensional coordinate system, and more particularly, to methods for processing acquired images of the vehicle wheel assemblies, from which vehicle wheel alignment measurements are determined.

Aligning vehicle wheels within specific tolerances is important for optimal performance, handling, and control of the vehicle, and for consistent wear of the tires. Alignment is performed primarily by adjusting the camber, caster, toe, and steering axis inclination angles of the vehicle suspension system. As part of calculating the alignment angles for the vehicle, the position and orientation (pose) of the wheel assemblies must be determined.

A typical target-based machine vision vehicle wheel alignment system 10, shown in FIG. 1, such as the Series 811 wheel alignment system configured with the DSP600 sensors manufactured by Hunter Engineering Co. of Bridgeton, Mo. consists of a console unit 12, imaging sensors 22, and a set of alignment targets 24. The console unit 12 contains a processor or computer 14 configured with image processing and vehicle wheel alignment software applications, and may incorporate various communication and operator interfaces, including a keyboard 18, a mouse, a printer, and a display device 16. The imaging sensors 22 are coupled to the computer 14, and alignment targets 24 are disposed in the field of view of the imaging sensors 22, typically mounted to the wheels 100 of a vehicle undergoing an alignment inspection.

Commonly, to view the left and right sides of a vehicle, one or more imaging sensors 22 are disposed on opposite sides of the vehicle, each having a field of view encompassing one or more wheels 100 of the vehicle. In alternative configurations, two imaging sensors 22 are provided on each side of the vehicle, each having a field of view encompassing a single vehicle wheel 100, i.e. a left front, left rear, right front, and right rear wheel, respectively. To facilitate vehicle wheel alignment, alignment targets 24 are mounted on the vehicle wheels 100, and observed by the imaging sensors 22. The alignment targets 24 preferably have predetermined control features 26 disposed on a target surface 25 which are identified in images obtained by the imaging sensors 22, and which facilitate a determination of the position and orientation (pose) of the alignment targets 24, as set forth in U.S. Pat. No. 6,064,750. The image processing may take place in the imaging sensor modules 22, in an interface computer, or in the console computer 14.

The pose of each wheel 100 is determined by estimated the position and orientation (pose) of the attached alignment target 24 from an acquired image. A mathematical model of the alignment target 24 is employed, containing the three-dimensional coordinates of visible features 26 on the target surface relative to a target coordinate system. An estimate of the target position in a coordinate system of the observing imaging sensor is chosen by searching for the prospective target position that minimizes the differences between the image plane locations of target features observed in the image and the prospective image plane locations of target features that should result from observing the alignment target 24 at the prospective target position. The prospective image plane coordinates of a target feature 26 are determined by applying a mathematical model of the imaging sensor to the prospective three-dimensional location of the target features 26. The prospective three-dimensional location of a target feature 26 is determined by combining the prospective target position with the target model information.

Once the position and orientation of each alignment target 24 is determined, the pose of the associated vehicle wheel 100 can be determined, and correspondingly, the various vehicle wheel alignment angle measurements may be either determined or calculated using known mathematical techniques. These angles typically include camber, caster, and toe angles for each vehicle wheel 100, the vehicle centerline, and the vehicle rear thrust line.

Some machine vision systems 10 do not use predefined alignment targets 24, and are configured to identify predetermined geometric features directly on the surfaces of the wheel or tire of each wheel assembly 100, such as projected light stripes or the circular wheel rim. These systems may utilize observed distortion of the geometric features, or changes in positions thereof, to determine positions and orientations of the associated vehicle wheels 100.

The next generation of machine vision vehicle wheel alignment systems may be implemented without requiring alignment targets 24 to be mounted to the vehicle wheels 100 or the use of predetermined geometric features. Instead, the wheel assembly 100 itself, consisting of the tire and supporting wheel rim, may function as an alignment target in images acquired by the imaging sensors 22. The processing system 12 may then use these images to calculate some or all of the six degrees of freedom (6-DOF) components consisting of positional data (X, Y, and Z coordinates) and rotational data (rotation about the X, Y, and Z axis), otherwise known collectively as pose and individually as pose components, associated with each wheel assembly 100 in an image. Using some or all of the calculated six degrees of freedom components, or pose information, various vehicle wheel alignment measurements may be determined using known mathematical techniques. The precision of the 6-DOF components is limited by how accurately identifiable features of interest can be located in the image of the wheel assembly 100.

While machine vision wheel alignment systems which utilize alignment targets 24 have the advantage of utilizing highly accurate, predefined target patterns to produce exact measurements, independent of each vehicle undergoing an alignment procedure, target-less machine vision alignment systems do not. The random features of interest associated with the vehicle wheel assemblies which are observable in the acquired images will likely vary from vehicle-to-vehicle, and from wheel assembly to wheel assembly. Accordingly, there is a need for image processing methods for use in machine-vision vehicle wheel alignment systems which are sufficiently robust to accommodate the wide range of features of interest which may be observed during target-less vehicle wheel alignment procedures.

BRIEF SUMMARY OF THE INVENTION

Briefly stated, the present invention provides a method for determining vehicle wheel alignment angles from acquired images of a vehicle wheel assembly using a cylindrical symmetry optimization.

An alternate embodiment of the present invention sets forth a method for identifying corresponding image features on a vehicle wheel assembly in two or more acquired images of the vehicle wheel assembly. Each of the acquired images is processed by an image processing system to identify patches or regions of interest associated with the vehicle wheel assembly. Corresponding patches or regions of interested are matched between acquired images to enable calculations identifying changes in the three-dimensional position and orientation of the vehicle wheel assembly between the acquired images, from which vehicle wheel alignment angles can be determined. Changes in position of identified patches, regions of interest, or features associated with the vehicle wheel assembly may be tracked through a sequence of acquired images.

A variation of the present invention sets forth a method for identifying the pose of a vehicle wheel assembly in three dimensional space from acquired images of the vehicle wheel assembly. Each of the acquired images is processed by an image processing system to features associated with the vehicle wheel assembly. The features are fitted to a mathematical model of a vehicle wheel assembly using superquadric or hyperquadric equations which define generally toroidal shapes. By identifying the best fit mathematical model to the observed vehicle wheel assembly features, the pose of the vehicle wheel assembly can be determined, from which vehicle wheel alignment angles can be identified using known mathematical techniques.

In an additional embodiment, a method of the present invention facilitates the determination of the axis of rotation of a vehicle wheel assembly from images containing features on the surface of the wheel assembly acquired by the imaging sensor systems of a vehicle wheel alignment system. The imaging sensor systems acquire at least two pairs of images of a vehicle wheel assembly, with the wheel assembly being rotated about an axis of rotation between the acquisition of each pair of images. The image pairs are processed to determine the axis of rotation of the wheel assembly in three dimensional space, from which at least one vehicle wheel alignment angle is determined.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 10 is an illustration of a morphing of an initial image of a three-dimensional image of a wheel assembly in an initial pose to a subsequent pose;

FIG. 12 is an illustration of an angle-side-angle technique for locating a three-dimensional feature by stereoscopic triangulation.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
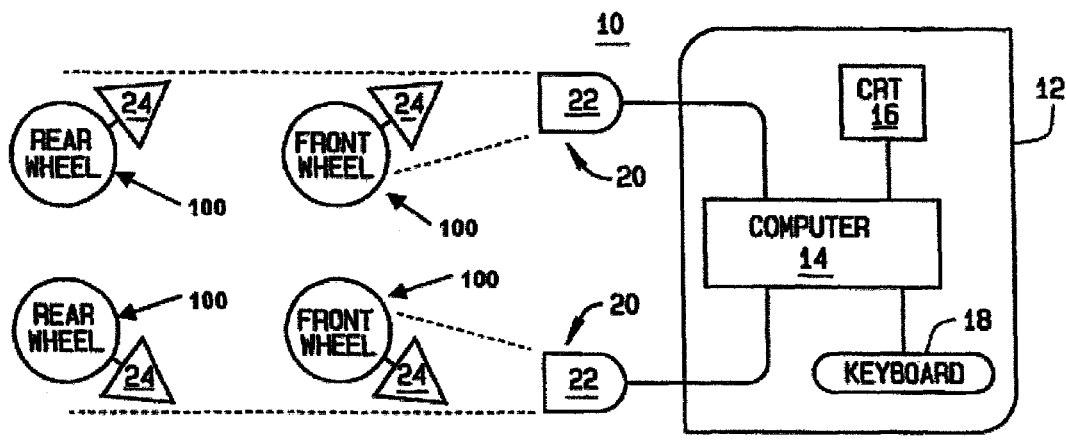
FIG. 1 is a simplified block diagram of a prior art machine-vision vehicle wheel alignment system utilizing wheel-mounted alignment targets.
Figure 2:
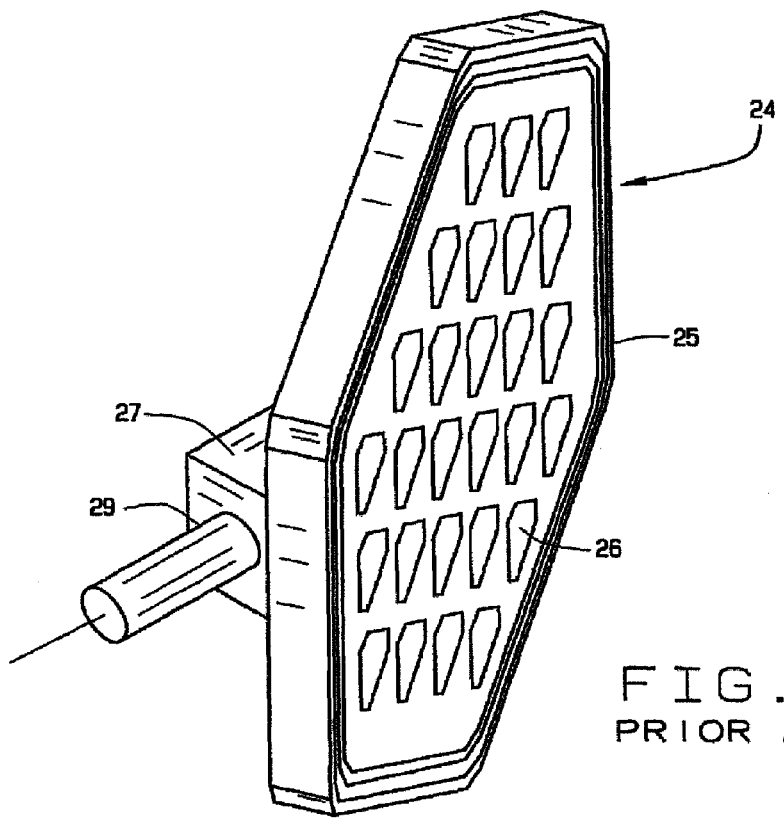
FIG. 2 is a perspective view of a prior art alignment target.
Figure 3:
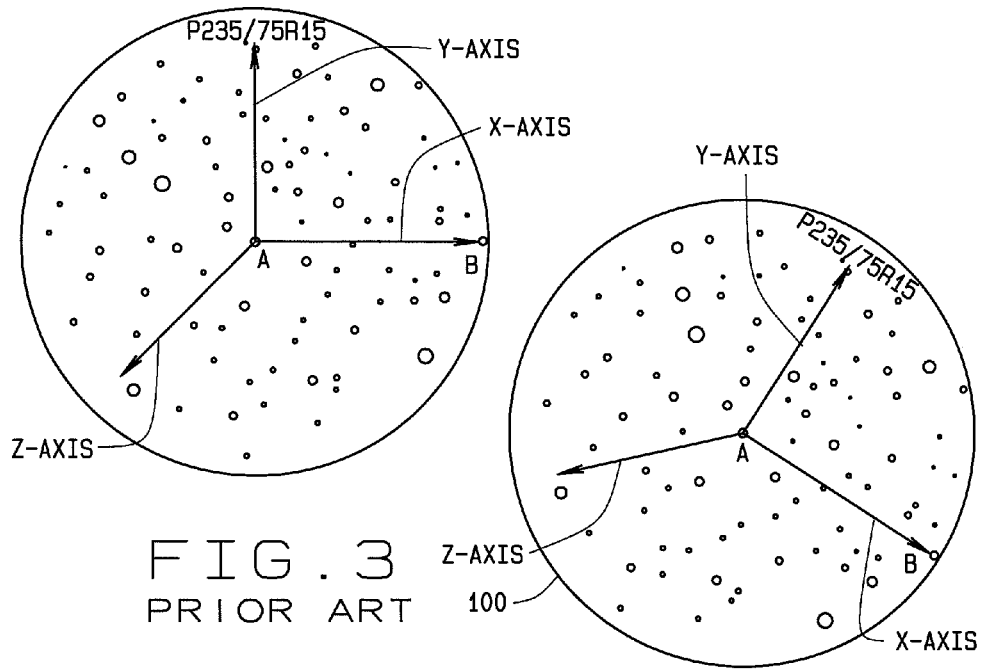
FIG. 3 is a pair of images of a feature visible on the surface of a wheel assembly before and after rotation of the wheel assembly about an axis of rotation.

Most vehicle wheel alignment parameters such as camber, caster, toe, and steering axis inclination can be calculated from a determination of the axis of rotation (AOR) for the wheels of the vehicle. The AORs may be determined from images of each wheel assembly on the vehicle acquired at a minimum of two different rotational positions. As shown in FIG. 3, features visible in an initial image of a vehicle wheel assembly 100 must be located in a subsequent image, and the associated change in image position used to calculate a movement in three-dimensional space of the corresponding portion of the wheel assembly 100. The collective movement of the observed and identified features in three-dimensional space may be analyzed to determine a single axis of rotation 102 having the highest degree of correspondence to the observed motion, together with a translational component (if desired) for each vehicle wheel.

In one embodiment of the present invention, stereo images of a vehicle wheel assembly are acquired by an associated set of imaging sensors. In general, at least two imaging sensors are utilized in the set of imaging sensors to acquire the stereo images, however, those of ordinary skill in the art will recognize that a variety of different configurations of sensors may be utilized to acquire suitable images for stereo image processing, such as the use of at least one moving imaging sensor or two or more fixed imaging sensors.

To determine a change in the pose of an associated vehicle wheel assembly, at least two stereo pairs of images of portions of the vehicle wheel assembly at two different rotational positions of the vehicle wheel assembly are processed by a vehicle wheel alignment system. The rotational positions of the vehicle wheel assembly at which each pair of stereo images is acquired, are preferably separated by at least 20 degrees of rotation about the wheel axis of rotation. Standard image processing techniques may be used to identify a predetermined feature present in each of the acquired images, such as the annular interface between the wheel rim and tire of the vehicle wheel assembly.

Since the annular interface between the wheel and tire is approximately a circle, in one method of the present invention, a pinhole lens model is utilized to project a tilted circle onto an image plane to project a shape similar to the observed image of the annular interface. The center of these projected circles can be located in three-dimensional space utilizing stereo triangulation techniques. The approximate normal vector of the axis of rotation may be identified from the tilt and yaw of the projected circle which best corresponds with the shape of the annular interface observed in the acquired images. Preferably, the approximation of the wheel axis of rotation is not used to directly determine vehicle wheel alignment parameters, but it is used as a starting value in an optimization algorithm to determine an accurate measurement of the wheel axis of rotation.

Figure 4:
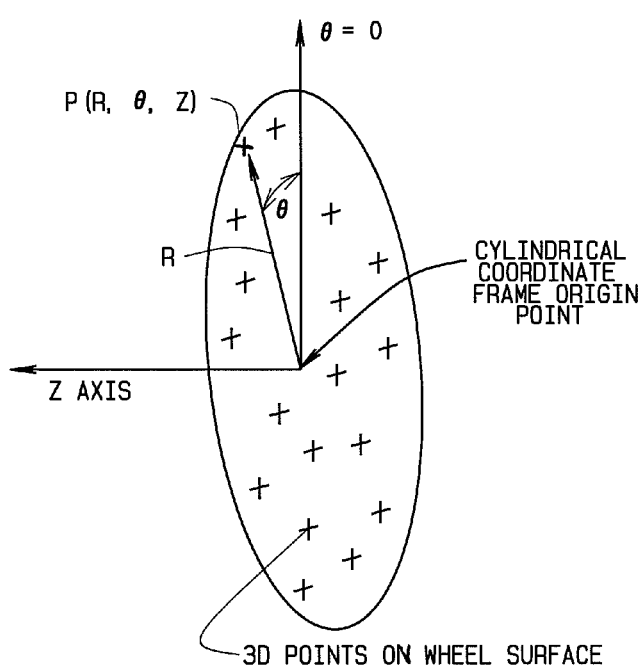
FIG. 4 is representation of a three-dimensional point cloud generated for a wheel assembly surface by stereo triangulation.
Figure 5:
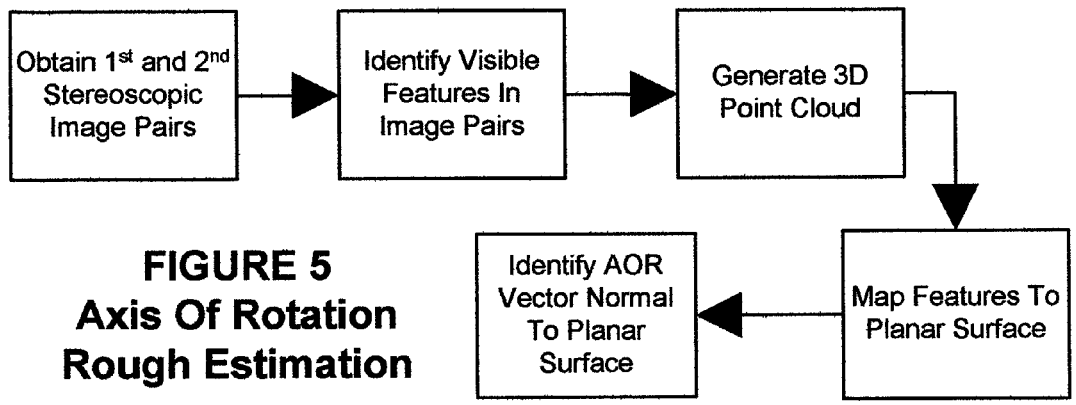
FIG. 5 is a flow chart illustrating the steps in a method for obtaining a rough approximation of a wheel axis of rotation from a set of stereoscopic image pairs.

As an alternative to identifying predetermined features present in each of the acquired images of the vehicle wheel assembly, stereo triangulation may be utilized with sets of identifiable random features observed on the surfaces of the vehicle wheel assembly which found in each acquired image of the stereo image pair. The position of the observed random features in each image is used to generate a corresponding three-dimensional point-cloud, as shown in FIG. 4. Using an estimate of where the vehicle wheel assembly is expected be, based upon knowledge of the imaging sensor locations relative to the position of the vehicle or vehicle supporting structure, as well as the fact that the wheel rim and tire side wall approximately define a disc-like surface, three-dimensional points on the wheel rim and tire side wall can be identified from the acquired images as illustrated by the flow chart of FIG. 5. The identified points may then be mathematically manipulated to correlate, such as by fitting or mapping, to a disc-like surface on a tilted three-dimensional plane, yielding an estimate of the three-dimensional position of the vehicle wheel assembly and the axis of rotation. The estimated three-dimensional position and axis of rotation of the disc-like surface may be used as a starting value in an optimization algorithm to determine an accurate measurement of the vehicle wheel assembly axis of rotation.

Figure 6:
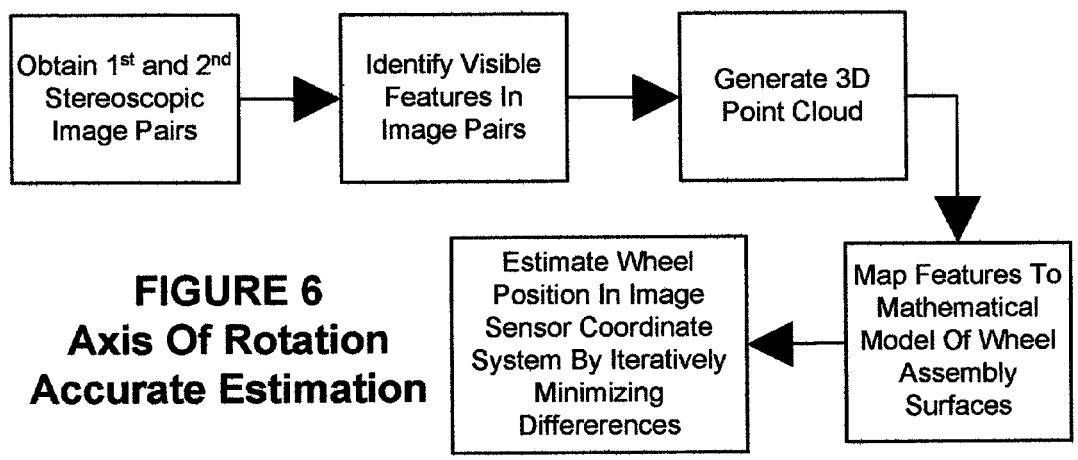
FIG. 6 is a flow chart illustrating the steps in a method for obtaining an accurate approximation of a wheel axis of rotation from a set of stereoscopic image pairs.

One optimization method which may be utilized to determine an accurate estimate of the axis of rotation uses the point-cloud of three-dimensional points identified on the surface of the wheel assembly. The point-cloud is mathematically correlated to a model of the vehicle wheel assembly. After the model of the vehicle wheel assembly has been defined for each rotational position of the wheel assembly, the axis of rotation (AOR) may be determined in substantially the same manner as is done with prior art alignment targets. Specifically, the pose of each wheel assembly is determined by estimating the pose components of the wheel surfaces from the acquired images. A mathematical model of the wheel surface is employed, containing the three-dimensional coordinates of visible features on the wheel surface relative to a wheel coordinate system. As shown in FIG. 6, an estimate of the wheel position in a coordinate system of the imaging sensor is chosen by searching for the prospective wheel position that minimizes the differences between the image plane locations of wheel features observed in the image, and the prospective image plane locations of wheel features that are expected to result from observing the wheel at the prospective wheel position.

The prospective image plane coordinates of a wheel feature are determined by applying a mathematical model of the imaging sensor to the prospective three-dimensional location of the feature. The prospective three-dimensional location of a wheel features are determined by combining the prospective wheel position with the wheel model information.

Figure 7:
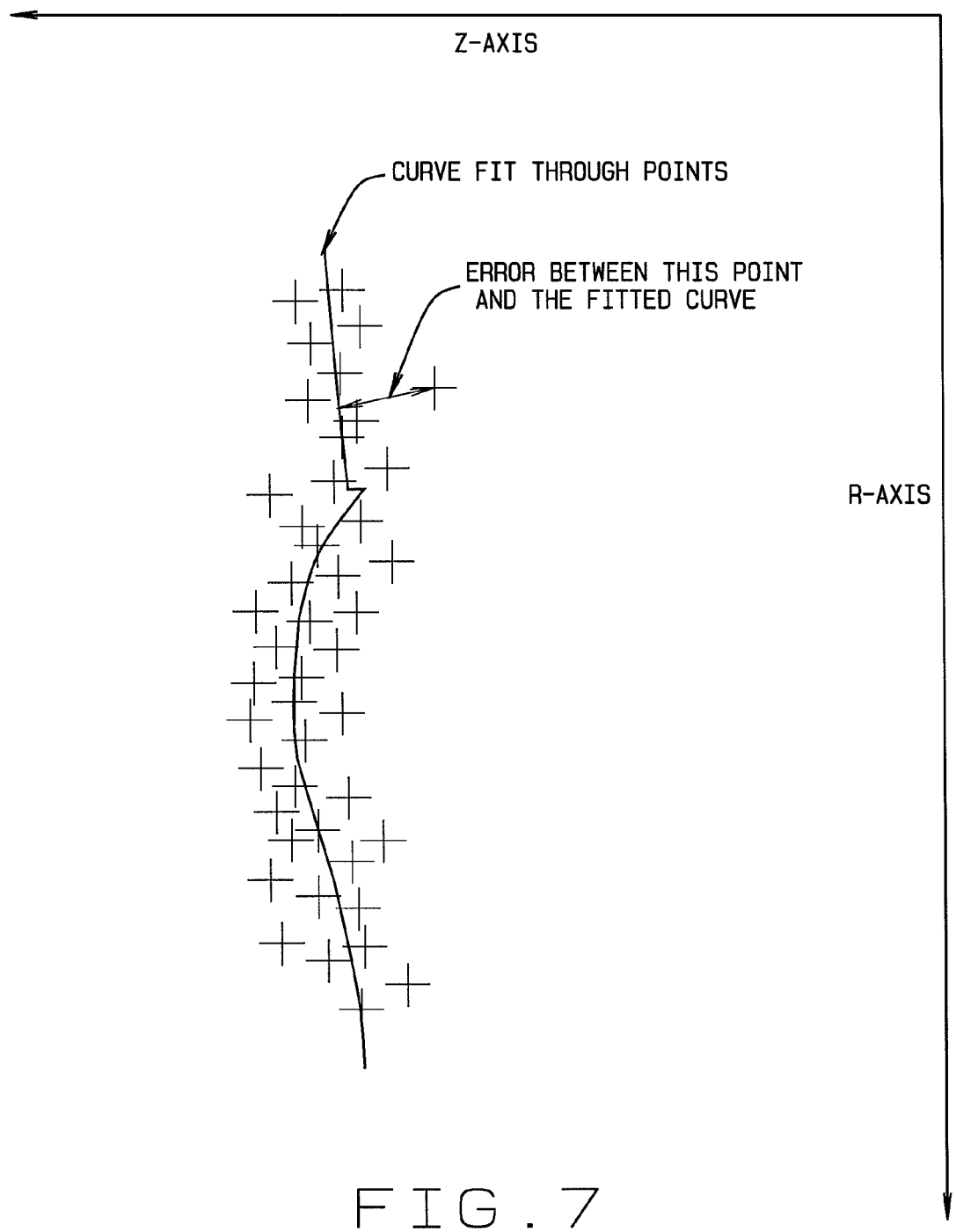
FIG. 7 is a two-dimensional representation of data from the three-dimensional point cloud shown in FIG. 4, illustrating a cross-sectional representation of a wheel assembly.

One simple wheel model approximates the wheel as a solid of revolution about the axis of rotation. The preferred coordinate system for this model is a cylindrical coordinate system which establishes an origin at the three-dimensional location of the center of the wheel, and the Z-axis along the estimated axis of rotation as seen in FIG. 4. Stereo triangulation may be used on all feature pairs found on the images of the side of the wheel assembly in each stereo pair of images to create a three-dimensional point-cloud from each stereo image pair. These points in the point-cloud are then transformed into the cylindrical coordinate system and projected onto a two-dimensional plane by zeroing the theta coordinate value, effectively collapsing all of the three-dimensional points onto a two-dimensional cross-section of the tire cut with a plane through the axis of rotation for the wheel as shown in FIG. 7.

A curve fit through the two-dimensional projection of points may be utilized to estimate the actual sidewall and visible rim profile of the wheel assembly cross-section. If the cylindrical coordinate system is aligned with the physical sidewall and visible rim profile of the wheel assembly, and the three-dimensional point error is randomly distributed, then the average two-dimensional distance from a three-dimensional point to the cross section will be minimized. The three-dimensional error associated with each point corresponds to the distance between the point and the curve fitted through the projection of the points. Summing the squares of all these point errors yields a global error function that will minimize when the cylindrical coordinate system is aligned with the physical wheel/tire sidewall. This enables an iterative mathematical optimization algorithm, such as the Levenberg-Marqardt optimization to move the cylindrical frame origin in two dimensions to the center of the wheel, and rotate the Z-axis in two dimensions, in the direction that corresponds to the wheel assembly toe and camber alignment angles. Following this optimization procedure, the axis of the cylindrical coordinate system will correlate with a high degree of precision to the wheel assembly axis of symmetry and the established pose of the wheel assembly.

Points from the same portion of the wheel surfaces may be used in each pair of stereo images, so that asymmetries in the wheel assemblies will not distort the results. For example, any part of the tire deformed by the vehicle weight in either wheel position is preferably excluded from use in determining the three-dimensional point-clouds.

The amount of wheel rotation between each pair of stereo images can be estimated from the amount of wheel translation plus an estimate of the wheel assembly diameter. Alternatively, a measure of wheel rotation can be determined by rotating features observed in the first stereo image pair until they are aligned with corresponding features in the second stereo image pair. Translational movement of the wheel assembly can be estimated by tracking translational movement of a feature or visible component in the images which is associated with a vehicle body during movement of the wheel assembly.

An alternative method for correlating a three-dimensional point-cloud to a wheel assembly utilizes a parametric model of the wheel assembly. A wheel assembly can be described by a mathematical equation, such as a superquadric or hyperquadric equation, which contains parameters that can be adjusted to change the size and shape of the modeled wheel assembly. The model can be used in an optimization algorithm to vary the parameters for a best fit to the point cloud and thus define the location of the wheel assembly and an orientation of the axis of rotation.

The superquadric equation representing a toroid, which represents the simplest form of a wheel assembly, has six adjustable shape parameters. The superquadric equation is:

$$X = a_1 \times (a_4 + s_1 \times c_1^{e_1}) \times s_3 \times c_3^{e_2}$$

$$Y = a_2 \times (a_4 + s_1 \times c_1^{e_1}) \times s_4 \times c_4^{e_2}$$

$$Z = a_3 \times s_2 \times c_2^{e_1}$$

where:
$a_1$ scales the X direction;
$a_2$ scales the Y direction;
$a_3$ scales the Z direction;
$a_4$ scales the radius of the torus;
$e_1$ is the power term for the spherical angle $\eta$ which controls the shape of the torus cross-section;
$e_2$ is the power term for the spherical angle $\Omega$ which controls the shape of the torus;
$c_1 = abs(\cos(\eta))$;
$c_2 = abs(\sin(\eta))$;
$c_3 = abs(\cos(\Omega))$;
$c_4 = abs(\sin(\Omega))$; and
$s_1$ thru $s_4$ are the initial signs of the angles $\eta$ and $\Omega$ which must be reapplied after the exponentiation.

The spherical angles are swept from $-\pi$ to $\pi$ to generate a full torus.

Figure 8:
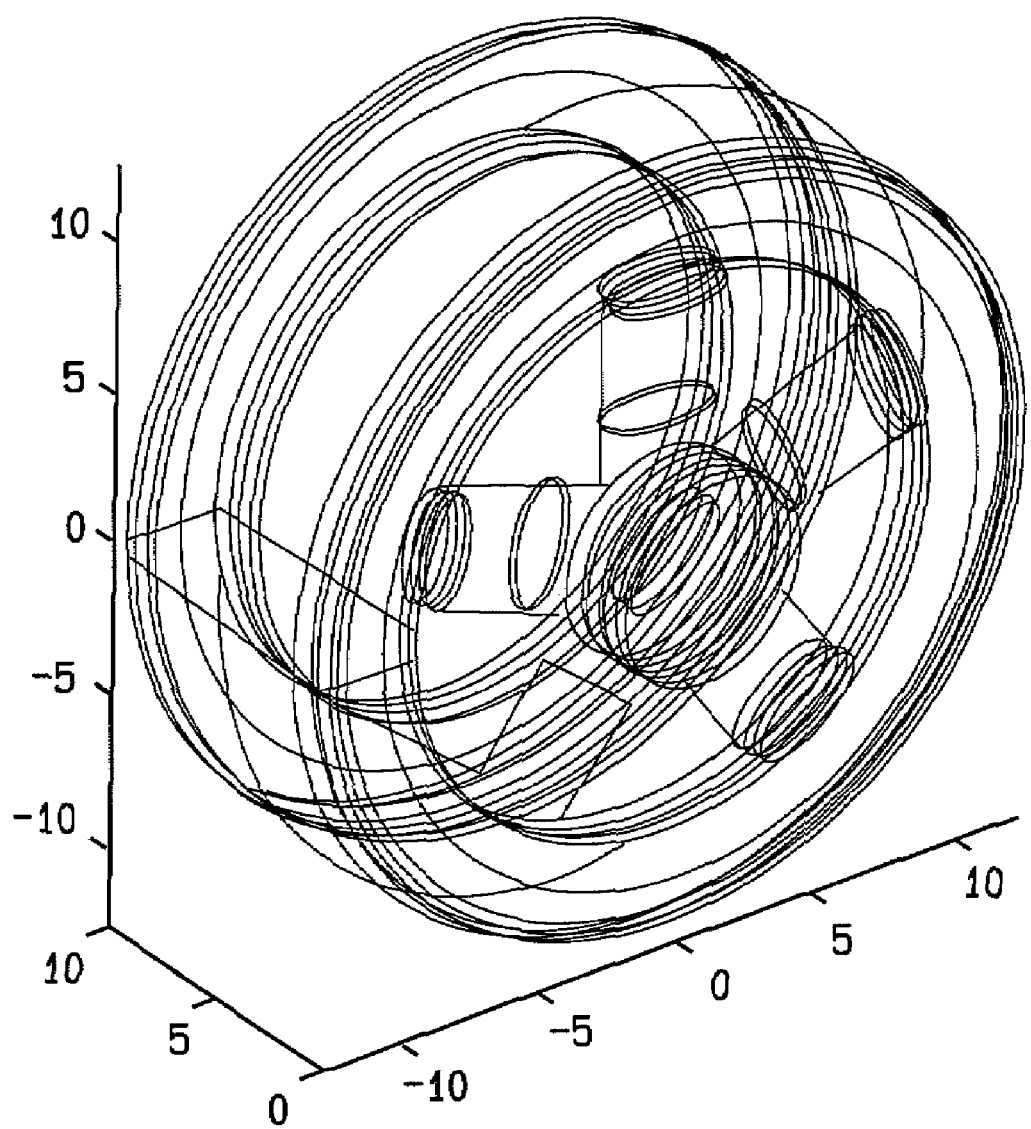
FIG. 8 is an example of the three-dimensional shape generated with a plurality of superquadric equations.

An optimization is used to increment the a's and e's while sweeping $\eta$ and $\Omega$ to give a "best fit" to the acquire point-cloud data. The example given is a simple torus, but more complicated structures can be generated through the superposition of more than one superquadric, as shown in FIG. 8. Those of ordinary skill will recognize that more elaborate shapes may be defined through the use of a hyperquadric equation.

To calculate the axis of rotation, an initial assumption is made that the wheel assembly was rotated without any changes in the toe or camber alignment angles. This is a common assumption made when compensating wheel assemblies during vehicle wheel alignment procedures. A virtual wheel target is generated, having a Z-axis which is aligned with the Z-axis of the cylindrical coordinate for the initial rotational position of the wheel assembly, and having an X-axis which is aligned with the X-axis of the left imaging sensor. Following rotational movement of the wheel assembly, the Z-axis of the virtual target is aligned with the Z-axis of a second cylindrical coordinate system for the second rotational position of the wheel assembly, while the X-axis of the virtual target is rotated by an amount equal to the amount of wheel rotation from the X-axis of the left imaging sensor. The axis of rotation can now be calculated in the same manner as is done with physical alignment targets.

Alternatively, instead of only acquiring two stereo image pairs at the initial and subsequent rotational positions of a vehicle wheel assembly, a sequence of stereo image pairs may be acquired by the imaging sensors during the course of rotation of the vehicle wheel assembly. The advantage of a sequence of stereo image pairs is that the rotational changes between each stereo image pair are reduced, facilitating the tracking of one or more features on the surface of the wheel assembly between stereo image pairs.

Building up a "point-cloud" of three-dimensional points on the surface of the wheel assembly involves identifying the correspondence between features or areas of interest in the image from one imaging sensor with features or areas of interest in the image(s) from other imaging sensors in the a stereo imaging system. Once the coordinates of features or areas of interest in multiple images have been estimated, stereo triangulation can be applied to identify three dimensional coordinates of the features or areas of interest. Since vehicle wheel assemblies vary greatly in appearance, it is useful to locate surface points by matching an arbitrary area of interest or "patch" from an image generated by one imaging sensor of the stereo imaging sensor set with the corresponding area from an image generated by a different imaging sensor of the stereo set. Those of ordinary skill in the art will recognize that the area of interest or "patch" may constitute an entire generated image, or may be a subset of a generated image. To ensure that the three-dimensional point coordinates can be estimated to sufficient precision, the two-dimensional coordinates of the matched patches in the multiple imaging sensor views may be measured to a precision finer than the width of a single image pixel.

For a given "master" patch from a first imaging sensor's image, a search is conducted to identify a corresponding patch from the second imaging sensor's image that constitutes the best match. The offsets between the coordinates of the master patch and those of the patch having the best match in the second image are typically non-integer values. However, the search is started by identifying the integer coordinate offsets that fit best. The best match involving integer coordinate offsets is usually within a few pixels of the more general best fit that allows non-integer offsets. The merit of a given potential match is evaluated by computing a similarity error function, for example, summing the square of the difference in image brightness over all corresponding pixels in the patches. This sum is then normalized by the number of pixels in the patch.

Since each imaging sensor may have different exposures and the lighting of the wheel may be different when each image is acquired, including the step of compensating for differences in overall brightness between the images from the various imaging sensors may improve overall patch-matching performance. To achieve a relative brightness adjustment, the average pixel brightness is calculated for the "master" patch (such as the left patch in a stereo-image pair) excluding any pixels which are saturated or which are substantially at the background dark level. Next, the average pixel brightness for each target patch in the second image (such as the right patch in the stereo-image pair) is calculated in a similar manner. Before calculating a degree of similarity as previously described, the brightness of each pixel in each target patch is adjusted by the ratio of the two measured brightness averages to reduce the effect of image brightness difference between the master patch and each target patch.

Once a corresponding target patch has been identified in the second image, the relative brightness of the two images in the region of the target patch and the master patch may be calculated with greater accuracy. For example, utilizing the brightness ratio previously used to identify the target patch as a starting point, the brightness for each pixel in the target patch may be incrementally adjusted to optimize the similarity value between the master patch and the target patch.

Once the integer coordinate offsets have been found that identify the patch in the image from the second sensor which is most similar to the master patch in the image from the first imaging sensor, a local two-dimensional match quality surface is constructed, from which a best sub-pixel match can be interpolated. An array of similarity values based on potential integer offsets between first and second imaging sensor image patches is constructed. The array dimensions may be set at seven units by seven units, with the center element in the array contains the similarity value from the best integer patch match. The values for the remaining elements of the array are constructed by computing similarities based on incrementally greater or lesser integer offsets of second imaging sensor image patch coordinates.

The same brightness adjustment ratio may be used to generate the entire array. For each row in the array, a parabola is fit to the similarity error values, and a minimum point is identified which has the integer vertical coordinate common to the row and the non-integer horizontal coordinate representing the bottom of the parabolic curve. For each column in the array, a parabola is fit to the similarity error values, and a minimum point is identified which has the integer horizontal coordinate common to the column and the non-integer vertical coordinate representing the bottom of the parabolic curve. A line is fit to all the points obtained as parabolic minima for the rows. A second line is fit to all the points obtained as parabolic minima for the columns. The intersection of these two lines is computed, which yields precise, sub-pixel coordinate offsets that can identify the optimum second imaging sensor image patch to match the master patch from the first imaging sensor image.

To accurately find patches that correspond in the master and target images, the patches must first be accurately located in each two dimensional image. Practically, this means that the patches must have structure in both horizontal and vertical directions. This can be determined by evaluating the shape of the parabolas in the columns and rows fit to the similarity array values. As an example, any patch where the similarity function changes too slowly in either the horizontal or vertical direction of the similarity array may be rejected.

Additional patch-matching performance may be realized by determining a normal vector for each patch, rather than assuming each patch is parallel to a planar surface representing the vehicle wheel assembly. The determined normal vectors may be transformed by the estimated motion of the vehicle wheel assembly along with the three dimensional patch center locations, resulting in a greater similarity match between the master patch in the first image and the transformed and reprojected patch in the second image.

To determine the patch normal vector, a coarse grid of normal vectors may be generated in (pitch, yaw) space around the normal axis of the vehicle wheel plane, and each one is then used to create a two-dimensional patch which is matched with the second image. The best normal vector will be the one which corresponds with the best similarity value. Once this vector is identified, a more precise normal vector is determined by generating more normal vectors in a small neighborhood around the best coarse grid normal vector, and selecting the one with the best similarity.

Directly matching areas between images in a stereo imaging pair of images is subject to at least two sources of error that should be minimized in order to achieve accurate wheel alignment angle measurements. The first source of error arises from differences in focal length and relative imaging sensor rotation about the lines of sight, and will likely prevent the pixel grids from ever overlaying exactly. The second source of error arises from the perspective differences between the two imaging sensors. Both types of errors can be reduced by creating a brightness interpolation surface from pixel brightness levels in one of the two stereo images. Preferably, the interpolation surface is applied after the three-dimensional points on the wheel assembly surfaces have been approximately located using the similarity interpolation methods described above. A plane can be fit to those points identified to lie on the side of the wheel assembly, and will serve as a "screen" onto which to project pixels during the stereo error correction process.

Initially, the pixels in the second image of a stereo image pair are projected onto the "screen" or plane. Next, the previously calibrated transform relationship between the two stereo imaging systems is utilized to transform the three-dimensional points on the "screen" or plane into the three-dimensional reference frame of the first stereo imaging sensor, and onto the imaging array of the first stereo imaging sensor. Next, a brightness value corresponding to the center of each pixel in the first image is interpolated from the adjacent pixels in the second image, to produce a "corrected" second imaging sensor pixel. These "corrected" pixels are then utilized to generate a virtual target patch, which is subsequently utilized to calculate a similarity value between the master patch and the actual target patch.

Figure 9:
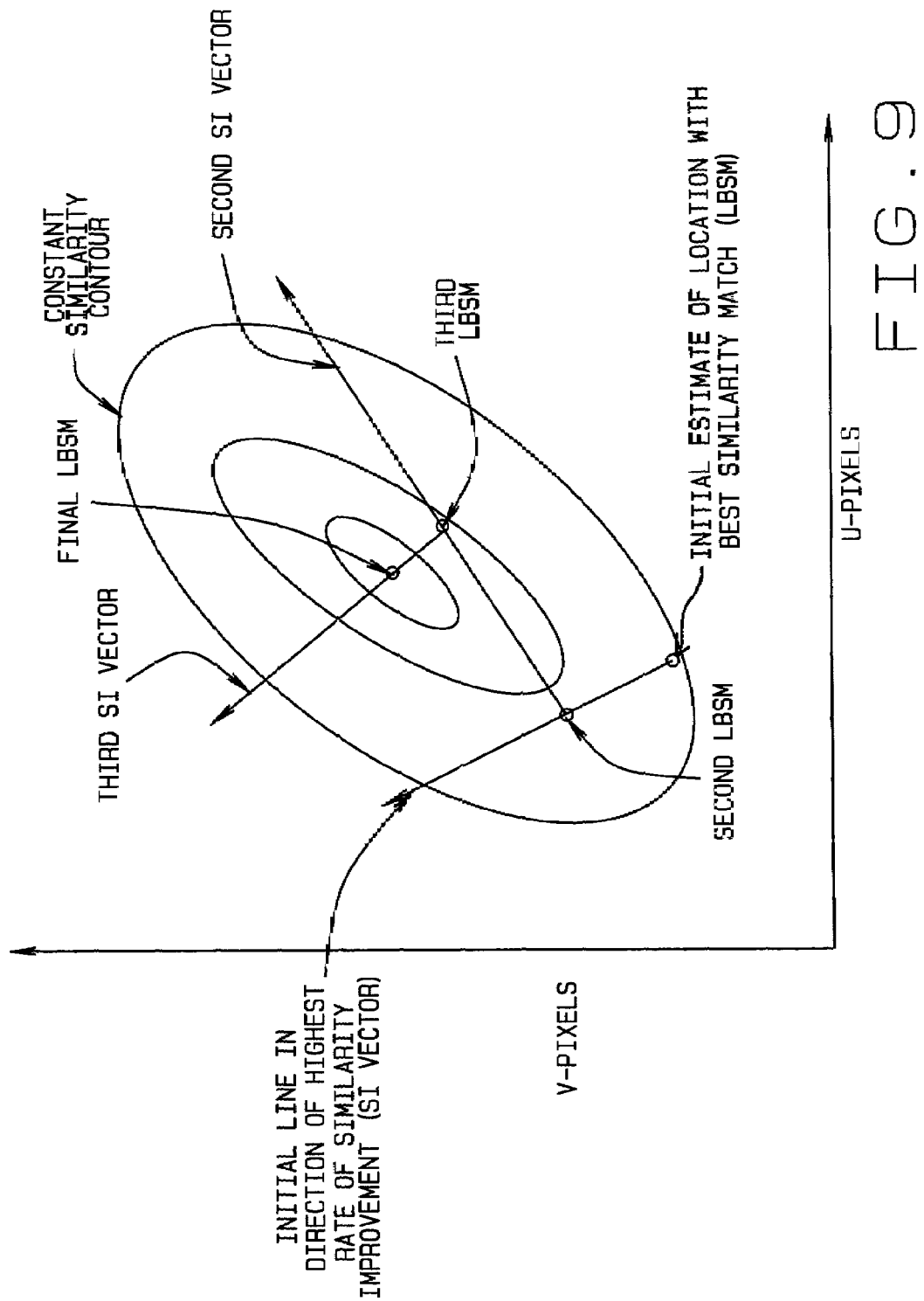
FIG. 9 is an illustration of the various stages of a similarity function minima search.

To initialize the search for a best sub pixel match between the master patch from a first image of a pair of stereo images, and an interpolated target patch from a second image of the pair of stereo images, it is preferred to start initially with the position match from the similarity interpolation process described previously. This location is used to interpolate pixels for the target patch, and to calculate the corresponding similarity values. The accuracy of the location with the maximum similarity may be improved by generating similarity error function values at sub-pixel distances from the previous results, re-computing the similarity error value, and searching around the estimated minima values. This procedure may be repeated until a desired accuracy level is reached, as is shown in FIG. 9.

Assuming that the similarity error functions are shaped with cross-sections generally fitting a parabola, an optimized search can be designed which will rapidly identify the minimum point. At each estimated minimum point, the similarity error function value is calculated for points spaced apart by a small $\Delta x$ and a small $\Delta y$. The differences in similarity in these directions define a vector pointing in the direction of maximum slope change for the similarity error function. The minimum point on the vector is estimated by generating a number of similarity error values along the length of the vector until a low value is identified between two high values. A parabolic curve fitted through the two high values and the low value estimates the minimum point along the vector. The similarity error function is again calculated at the identified minimum point along the vector, and the slope vector calculation/minimum point procedure is repeated at least once, until the difference between sequentially determined minimum points falls below a predetermined value corresponding to a desired degree of accuracy. This process tends to find and follow the bottom of the linear trench shape.

With sufficient predetermined information describing the mathematical characteristics of the optics associated with an imaging sensor, the three-dimensional configuration of an object being imaged, and the relative locations of the object and the imaging sensor, it is possible to predict the size and shape of the apparition of the three-dimensional object in the two-dimensional image generated by the imaging sensor. The mathematical model of the imaging sensor enables identification of how the visible features of the three-dimensional object will be projected to corresponding features in the two-dimensional image.

If only the edges or boundaries of the three-dimensional object are projected onto the two-dimensional image, the two-dimensional image will be a cartoon-like outline of the object. However, if the three-dimensional model of the object includes color or gray-level appearance of numerous tiny spots distributed across the three-dimensional object's exterior surfaces, a realistic image of the object can be constructed. Similarly, it is well known that a stereo pair of imaging sensors can be employed to construct a three-dimensional profile of the visible surfaces of a three-dimensional object by triangulating to identify the depth of features visible in the images from the left and right imaging sensors.

In one embodiment of the present invention, image intensity information associated with a vehicle wheel assembly obtained from one imaging sensor in a stereoscopic pair of imaging sensors is mapped to a multi-dimensional depth map which may be generated from the pair of stereoscopic images. The multi-dimensional depth map may be represented as a set of points, with each point identifying a spatial coordinate of a point on the object's surface, and may include additional information associated with that point, such as color or gray-level illumination intensity values.

The multi-dimensional depth map may be generated using an initial physical relationship between the pair of stereo imaging sensors and the three-dimensional object being imaged, or by any other suitable means including those which do not require stereoscopic imaging, such as by using a time-of-flight sensor or structured light in combination with a single imaging sensor. The physical relationship can be expressed as the combination of the three-dimensional object's pose relative to the imaging sensor. This pose information may be stored using six-degree-of-freedom homogeneous coordinates, which typically involve retaining three components of position information, and three components of attitude information, i.e. the pose of the object.

By combining the multi-dimensional depth map of a three-dimensional object with the predetermined knowledge of the imaging sensor optics, it becomes possible to generate a realistic estimate of the two-dimensional image which will result from placing the three-dimensional object at a pose relative to the imaging sensor which is different from the pose involved in the creation of the multi-dimensional depth map. This is done by correlating image intensity or color information from one stereoscopic image sensor image of the object in an initial pose to a synthesized image of the object in a prospective pose. The correlation is a reverse projection followed by a projection. Viewing the initial and synthetic images provides the impression that portions of one image were distorted or "morphed" to create the second image as shown in FIG. 10.

The ability to synthesize one perspective view of a three-dimensional object from another view of the object can be exploited to determine the precise pose of a vehicle wheel assembly, thus facilitating wheel alignment without the customary mounting of a wheel adapter and alignment sensor or rigid machine-vision alignment target.

Figure 11:
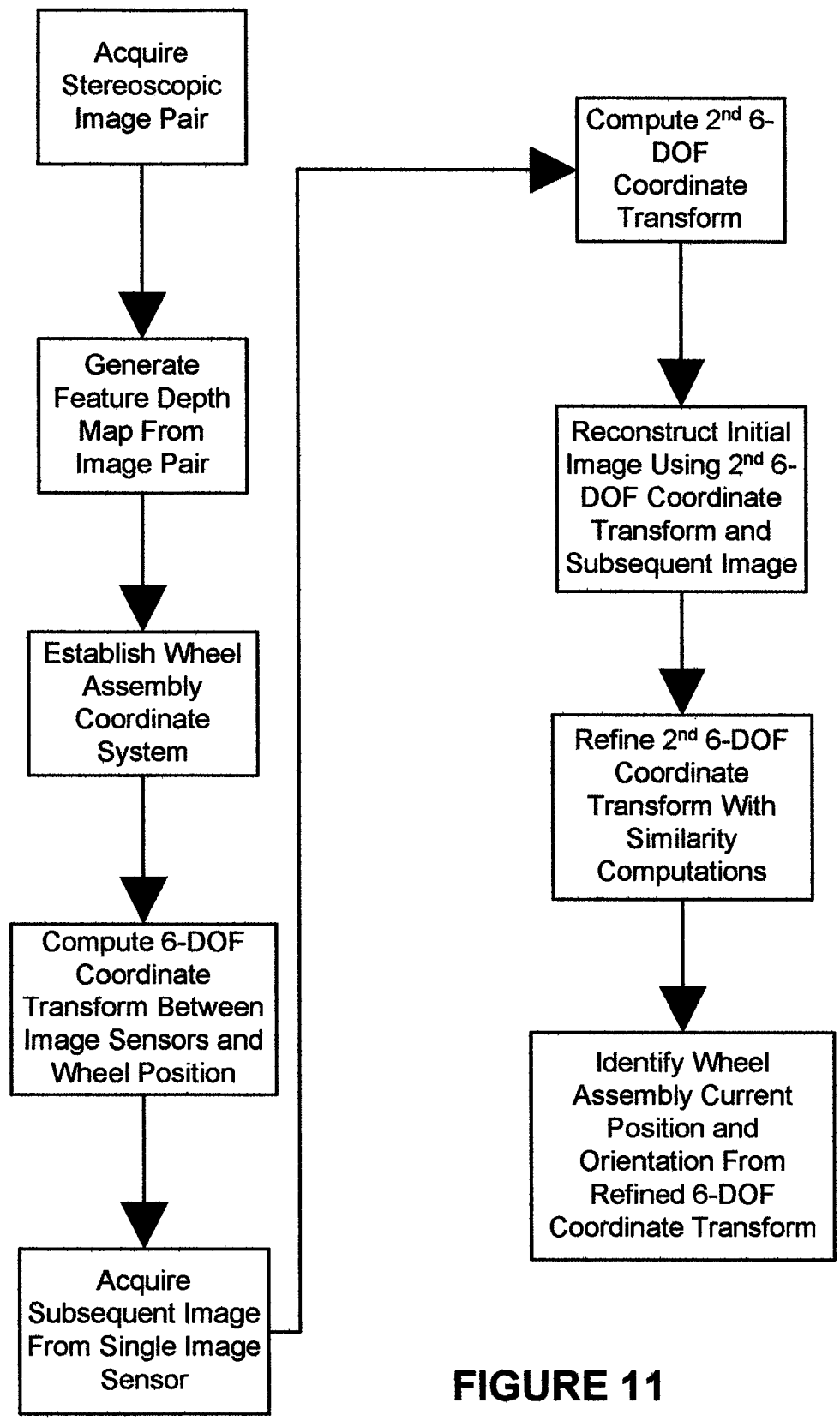
FIG. 11 is a flowchart illustrating the steps of an image morphing method of the present invention for estimating wheel alignment.

In an alternate embodiment of the present invention, illustrated in FIG. 11, the following method is utilized to facilitate wheel alignment using the aforementioned image processing techniques: (1) Images of a vehicle wheel assembly in an initial position are acquired by a stereoscopic pair of imaging sensors; (2) a feature depth map of the surfaces of the vehicle wheel assembly is generated; (3) a wheel-assembly coordinate system is established, and used to retain the feature depth map; (4) a six-degree-of-freedom homogeneous coordinate transform which describes the initial relationship between the stereoscopic imaging sensors and the wheel assembly in the initial position is computed.

A subsequent image of the wheel assembly is acquired using only one of the stereoscopic imaging sensors, and a new estimate of the six-degree-of-freedom transform is determined from the wheel assembly to the imaging sensor. The transform is determined by guessing an initial value, and refining the guess until a transform value is determined which best facilitates a reconstruction (morphing) of the initial image from the imaging sensor from the subsequent image. An image similarity function is utilized to evaluate the closeness between the reconstructed image and the initial image, with local components of the similarity computation used to guide the search for a better solution. Preferably, the morphing operation uses the feature depth map of the wheel assembly plus the initial and prospective transforms to map points between the current image sensor images and the reconstructed initial images from the same image sensor of the stereoscopic pair. In general, this amounts to an association of a point in the reconstructed initial image that has integer pixel coordinates, with a point in the current image sensor image having non-integer pixel coordinates. An interpolation operation determines an image intensity value from the surrounding pixel intensities of the current image sensor image. This interpolation intensity can then be stored in connection with the associated pixel of the reconstructed initial image.

An advantage of using the morphing method for estimating wheel assembly pose is that the precise numerical results do not directly rely upon the identification of image features or areas of interest, and matching them across initial and subsequent images. Although some feature recognition is required, however, to distinguish the visible portion of the vehicle wheel assembly from background features in the images.

Computational efficiency may be gained by computing a rough guess of vehicle wheel assembly pose using coarse feature matching, and subsequently applying the morphing techniques to converge on a solution having a higher degree of accuracy.

The geometric relationship between a vehicle wheel assembly whose three-dimensional location is being estimated and the components of the imaging sensor can be analyzed through use of a imaging sensor model. Even though the imaging sensor typically involves a lens to guide rays of light between the external scene and the image plane, it can be useful to model the image acquisition process as if the imaging sensor has a pinhole in place of the lens. The pinhole model allows the employment of a very simple projection geometry. An imaging sensor coordinate system can be established, with the origin placed at the pinhole. The imaging sensor coordinates system can be the basis of assigning three-dimensional coordinates to vehicle wheel assembly features in the scene. The perpendicular distance between the pinhole and the image plane is called the focal length. The extension out into the scene of the perpendicular line segment from the image plane to the pinhole becomes the positive Z-axis of the imaging sensor coordinate system. The X and Y axes of the imaging sensor coordinate system radiate out from the pinhole, perpendicular to the Z axis and perpendicular to each other. The X axis is parallel to the horizontal edges of the image plane, and the Y axis is parallel to the vertical edges of the image plane.

Points on the image plane can be given two-dimensional coordinates. The origin of this image plane coordinate system is the point where the Z-axis of the imaging sensor coordinate system intersects the image plane. Because the pinhole imaging sensor inverts the image of an object in the scene, the X and Y axes of image plane coordinates will be parallel to the corresponding X and Y axes of imaging sensor coordinates, but the image coordinate axes will point in directions opposite to the directions of the corresponding imaging sensor coordinate axes.

Each point on the image plane maps to a series of points in the scene space. The correlation can be embodied by a ray emanating from the image plane point and passing through the pinhole and out into the scene-space. This leads to projection equations that can relate the coordinates of a vehicle wheel assembly feature in the scene to the image plane coordinates of that feature's apparition in the image. Those equations are as follows:

Pinhole Projection Equations $$X_{image} = X_{scene} \frac{f}{Z_{scene}}$$

and $$Y_{image} = Y_{scene} \frac{f}{Z_{scene}}$$

In the above equations, f represents the focal length of the imaging sensor.

An ideal imaging sensor lens might project scene imagery in a manner identical to a pinhole, but most realistic lenses only approximate the pinhole behavior. A phenomenon known as spherical aberration will distort the image of a vehicle wheel assembly from the shape it would have appeared with a pinhole imaging sensor. Spherical aberration causes a distortion that tends to offset the apparition of image features in a radial direction relative to the point where the lens' optical axis intersects the image plane. Other sources of distortion may include misalignment of the multiple refractive elements in a complex lens, and some of these other distortion behaviors include both radial and non-radial components.

When precise imaging sensor-based measurements are desired, it is very practical to model the imaging sensor as if pinhole projection occurs, followed by the subsequent application of radial and tangential distortion to the image. The mathematical parameters of the distortion process are intrinsic characteristics of the particular imaging sensor, and such parameters can be measured during imaging sensor calibration process. Other intrinsic imaging sensor parameters relate to the pinhole model, such as focal length.

When the numerical parameters of the distortion process are available, it is possible to compute the distorted image-plane location of an image feature from its distortion-free pinhole-projected location. It is useful to compute the parameters for the inverse of this process. When the inverse distortion model has been characterized, it is possible to compute the distortion-free location of an image feature from the distorted location. Such "un-distorted" points can then be related to three-dimensional locations in scene-space using simple pinhole projection geometry.

Once the intrinsic characteristics of the two imaging sensors of a stereo pair are known, the physical interrelationship between the two imaging sensors is determined. The left and right imaging sensors are typically mounted on a rigid frame or otherwise secured in a fixed relationship. A cross-calibration procedure can be employed to precisely measure the spatial translation and rotation between the two imaging sensors. The resulting cross-calibration information can be organized as a six-degree-of-freedom homogeneous coordinate transform that can convert the coordinates of a point expressed in left imaging sensor coordinates into the coordinates of that same point expressed in right imaging sensor coordinates.

Once the intra-pair cross-calibration is available, stereo image pairs can be acquired and processed to estimate three-dimensional location of objects in the scene.

The correspondence between the apparition of a area of interest in the left imaging sensor image and the apparition of the corresponding area of interest in the right imaging sensor image must be found. This means identifying the row and column coordinates of the area of interest in both a left and a right imaging sensor images. Ideally, the position of the area of interest's apparition on the image plane is known to a precision much finer than the size of a pixel. The coordinates of an area of interest in an image from either imaging sensor would be expressed as a pair of floating point numbers.

Area of interest or feature coordinates obtained from an acquired image suffer from the effects of lens distortion. An "un-distort" operation is then applied, using known characteristics of the lens to obtain the distortion-free coordinates where the area of interest would have appeared, had a pinhole imaging sensor been employed. Knowing the undistorted coordinates of a area of interest, pinhole geometry allows the computation of directional vectors pointing from each imaging sensor's pinhole toward the area of interest's location in space. To facilitate upcoming triangulation computations, the area of interest direction vector from one of the imaging sensors, nominally the right, should be converted to the coordinates of the other imaging sensor, nominally the left.

In stereoscopic computations, the baseline is defined as the line segment linking the pinhole points of the two imaging sensors. Knowing the coordinate transform from one imaging sensor to the other allows identification of the length and direction of the baseline. Ideally, the baseline and the area of interest direction vectors from the right and left imaging sensors allow the identification of a long, narrow triangle whose most acute vertex represents the three-dimensional location of the viewed object's area of interest.

The directions of the area of interest rays are generally known to less-than-perfect accuracy, and the two area of interest rays lie on skew lines. This happens because of imperfect location of features on the image plane, plus the mis-registration between the imaging sensors. Stereo imaging sensor mis-registration means having an imperfect estimate of the imaging sensor cross-transform. The mis-registration error has directional components that can be broken into a part that is parallel to the baseline and a part that is perpendicular to the baseline. The horizontal component biases the angle between left and right area of interest rays (disparity) and causes an error in the computed stereo range. If the identity of the area of interest is properly matched across left and right images, the vertical component of mis-registration can be observed and used to diagnose system failures.

Ideally, the left and right area of interest rays would lie in a common plane that includes the baseline. But if there is vertical mis-registration, the plane that contains the baseline and the left imaging sensor's area of interest ray will not coincide with the plane that contains the baseline and the right imaging sensor's area of interest ray. The planes containing the area of interest rays form a narrow wedge, and the angle between these planes represents the vertical mis-registration angle.

It is reasonable to assume that neither area of interest ray plane is "correct", but that each estimated ray has about the same amount of measurement error. Therefore, it is preferable to choose a common plane that lies in between the two, and to project both area of interest rays onto that common plane. The common plane can be found using normal vectors. The cross product of the left area of interest ray with the baseline vector yields the normal vector of the left area of interest ray plane. The cross product of the right area of interest ray with the baseline vector yields the normal vector of the right area of interest ray plane. The average of these two normal vectors is used to obtain a normal vector for the common plane. Alternatively, the plane formed by the left imaging sensor's area of interest ray and the baseline can be used as the common plane. In that case, the normal vector for the common plane equals the normal vector of the left area of interest ray plane.

The arccosine of the dot product of the normal vector of the left area of interest ray plane and the normal vector of the right area of interest ray plane are computed to yield the vertical mis-registration angle. The value of the vertical mis-registration angle can be used as a rough gauge of system accuracy. If the mis-registration angle is larger than expected, that may be symptomatic of an incorrect area of interest match across the left and right images or of a poor cross-transform between the left and right imaging sensor coordinate systems.

To obtain a proper triangle to complete stereoscopic triangulation, the two imaging sensor-to-area-of-interest rays are adjusted and projected into the nearby common plane. The adjustment amounts to a small rotation of each area of interest ray about the baseline. The left ray rotation and right ray rotation would be equal and opposite in direction. After such adjustments, the baseline and the two imaging sensor-to-area-of-interest rays all lie in the common plane and define a triangle.

The triangle formed by the adjusted area of interest rays and the baseline can be solved via an angle-side-angle technique, as illustrated in FIG. 12. Everything in the diagram lies in the plane that contains both the baseline and the area of interest.

The angle between the baseline and the area of interest ray from the left imaging sensor to the area of interest can be found by expressing those two items as three-dimensional vectors, taking the dot product of the vectors and taking the arccosine of the dot product. The angle between the baseline and the area of interest ray from the right imaging sensor to the area of interest can be found by the same technique.

Knowledge of the two angles and the baseline distance is enough to finish solving the triangle. To obtain the three-dimensional coordinates of the area of interest point, lateral displacement and a range are computed. To visualize these distances, a line segment is drawn from the area of interest point that intersects perpendicularly with an extension of the baseline. The intersection is called the Normal point. The distance between the left imaging sensor pinhole and the normal point is called the Lateral Displacement, marked "S" on FIG. 12. The distance between the feature and the normal point is the range, marked "R" on FIG. 12. These two distances are computed using the following equations:

$$R = \frac{b \cdot \tan\theta_R}{\frac{\tan\theta_R}{\tan\theta_L} - 1}$$

and $$S = \frac{R}{\tan\theta_L}$$

Once the lateral displacement and range have been computed, these distances are converted into vectors. A lateral displacement vector having length S and a direction matching the direction from the left imaging sensor pinhole to the right imaging pinhole is generated. A range vector having length R is generated. The direction of the range vector is obtained by taking the cross product of the baseline vector and the normal vector of the common plane. Starting from the left imaging sensor pinhole and translating along these new vectors in series yields the three-dimensional coordinates of the estimated area of interest location, in left imaging sensor coordinates.

While the various methods of the present invention have been described in the context of determining vehicle wheel alignment angle measurements for use with a vehicle wheel alignment system, those of ordinary skill in the art will recognize that the techniques and methods set forth herein may be adapted for use with other vehicle service systems capable of acquiring images of a vehicle wheel assembly, such as vehicle wheel balancers and vehicle tire changing systems, and which may require information identifying one or more pose components of a vehicle wheel assembly during a vehicle service procedure.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for determining at least one pose component associated with a vehicle wheel assembly, comprising:
   acquiring at least two images of at least a portion of the vehicle wheel assembly surface;
   identifying a corresponding area of interest on the vehicle wheel assembly surface in each of said images;
   generating multi-dimensional data representative of each of said identified corresponding areas of interest;
   correlating said multi-dimensional data to a surface of a multi-dimensional mathematical model; and
   wherein said mathematical model represents at least one pose component of a surface having symmetry about an axis.

2. The method of claim 1 wherein an axis of symmetry of said mathematical model represents an estimate of a vehicle wheel assembly axis of rotation.

3. The method of claim 1 further including the step of transforming said multi-dimensional data into a three-dimensional cylindrical coordinate system, and subsequently collapsing said multi-dimensional data into two dimensions of said cylindrical coordinate system by minimizing a theta coordinate value to generate a representation of at least a portion of a vehicle wheel assembly cross section profile in a plane cut through an axis of rotation of said vehicle wheel assembly.

4. A method for determining at least one pose component associated with a vehicle wheel assembly, comprising:
- acquiring at least two images of at least a portion of the vehicle wheel assembly surface;
- identifying a corresponding area of interest on the vehicle wheel assembly surface in each of said images;
- generating multi-dimensional data representative of each of said identified corresponding areas of interest;
- correlating said multi-dimensional data to a mathematical model by projecting said multi-dimensional data onto a plane to generate a representation of at least a portion of a vehicle wheel assembly cross section;
- wherein said mathematical model represents at least one pose component of a surface having symmetry about an axis; and
- utilizing an iterative optimization process to identify a vehicle wheel assembly axis of symmetry from said generated representation.

5. The method of claim 1 wherein said mathematical model represents a disc-like object on a tilted planar surface; and
- wherein axis of rotation of the mathematical model and provides an initial estimate of a vehicle wheel assembly axis of rotation for an optimization algorithm.

6. A method for determining at least one pose component associated with a vehicle wheel assembly, comprising:
- acquiring at least two images of at least a portion of a surface of the vehicle wheel assembly;
- identifying a corresponding area of interest in each of said images;
- generating multi-dimensional data representative of shapes of said identified corresponding areas of interest; and
- correlating said multi-dimensional data to a parametric model of the vehicle wheel assembly described by a mathematical equation containing a plurality of parameters that can be adjusted to alter the size and shape of the modeled vehicle wheel assembly.

7. The method of claim 6 wherein the said parametric model is in the form of at least one hyperquadric equation.

8. The method of claim 6 wherein the said parametric model is in the form of at least one superquadric equation representing a toroid and having six adjustable shape parameters.

9. A method for calculating at least one alignment angle of a vehicle wheel assembly, comprising:
- acquiring first and second images of at least a portion of the vehicle wheel assembly;
- generating a multi-dimensional depth map of surface features of the vehicle wheel assembly from said first image, said depth map represented as a set of points, each identifying a three-dimensional spatial coordinate of a point on the surface of the vehicle wheel assembly together with an image intensity value; and
- determining a change in at least one pose component associated with the vehicle wheel assembly between said first image and said second image utilizing said generated multi-dimensional depth map.

10. The method of claim 9 further including the steps of iteratively generating representations of the vehicle wheel assembly at altered poses utilizing said multi-dimensional depth map and comparing said representations of the vehicle wheel assembly with said second image of the vehicle wheel assembly to identify at least one pose component associated with the vehicle wheel assembly as represented in said second image.

11. The method of claim 9 further including the step of morphing said multi-dimensional depth map to synthesize an estimate of an altered pose of the vehicle wheel assembly associated with said second image.

12. The method of claim 11 wherein said morphing of said multi-dimensional depth map produces an estimated image of the said area of interest corresponding to area of interest as observed in said second image.

13. The method of claim 11 further including the step of iteratively optimizing said altered pose estimate using the said morphed multi-dimensional depth map to calculate best-fit parameters.

14. A method for determining during a vehicle service procedure, at least one pose component associated with a vehicle wheel assembly, comprising:
- acquiring at least one image of at least a portion of a surface of the vehicle wheel assembly;
- generating a plurality of multi-dimensional data points representative of at least a portion of said surface of said vehicle wheel assembly in said acquired image;
- correlating said plurality of multi-dimensional data points to a surface of a mathematical model which is representative of said vehicle wheel assembly; and
- wherein a pose component of said mathematical model represents a pose component associated with said vehicle wheel assembly.

15. The method of claim 14 for determining at least one pose component associated with a vehicle wheel assembly wherein said step of correlating said multi-dimensional data points to said mathematical model includes fitting said plurality of multi-dimensional data points to said mathematical model at a plurality of iterative poses to identify a best-fit pose of said mathematical model with said acquired plurality of multi-dimensional data points.

16. The method of claim 14 for determining at least one pose component associated with a vehicle wheel assembly wherein said plurality of multi-dimensional data points define a point cloud which is correlated to said surface of said mathematical model.

17. The method of claim 3 further including the step of iteratively adjusting alignment of said cylindrical coordinate system to minimize three-dimensional error associated with each point of multi-dimensional data and said generated representation of the vehicle wheel assembly cross section profile, said coordinate axis and pose of said cylindrical coordinate system correlated to the vehicle wheel assembly axis of symmetry and established pose when said three-dimensional error is minimized.

* * * * *

UNITED STATES PATENT AND TRADEMARK OFFICE
CERTIFICATE OF CORRECTION

PATENT NO.        : 7,583,372 B2                                        Page 1 of 1
APPLICATION NO.   : 11/421181
DATED             : September 1, 2009
INVENTOR(S)       : Shylanski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 109 days.

Signed and Sealed this

Fourteenth Day of September, 2010

David J. Kappos
*Director of the United States Patent and Trademark Office*